United States Patent

Dixon

[15] 3,666,029
[45] May 30, 1972

[54] TUNNELING CUTTER GAGE RING REPLACEMENT

[72] Inventor: Robert L. Dixon, Whittier, Calif.
[73] Assignee: Smith International, Inc., Newport Beach, Calif.
[22] Filed: Oct. 23, 1970
[21] Appl. No.: 83,508

[52] U.S. Cl. ............................................175/374, 76/108 A
[51] Int. Cl. .....................................E21b 9/12, E21c 13/01
[58] Field of Search..................175/342, 353, 374, 375, 383, 175/382, 361–364; 76/108 A; 79/401, 526

[56] References Cited

UNITED STATES PATENTS

| | | | |
|---|---|---|---|
| 2,704,204 | 3/1955 | Koontz | 175/374 X |
| 3,326,307 | 6/1967 | Rudy | 175/374 |
| 3,216,513 | 11/1965 | Robbins et al. | 175/374 X |
| 3,593,812 | 7/1971 | Peterson | 175/374 X |

*Primary Examiner*—David H. Brown
*Attorney*—Allan D. Mockabee

[57] ABSTRACT

A rotary cutter for tunneling machines comprising one of a series of gage cutters about the periphery of a face plate, the outer or gage end of the gage cutters being subject to rapid deterioration resulting in wearing away of the metal of the body of the cutter and displacement of the hardened metal inserts around the gage end, a gage ring about the gage end being produced by cutting inwardly beneath the gage row and possibly one or more additional rows of hardened inserts, and then cutting down from a valley between rows of hardened inserts to the first described separation to provide a removable and replaceable gage ring portion on the cutter containing peripheral rows of hardened metal inserts in the same manner as the damaged gage ring portion being replaced.

6 Claims, 6 Drawing Figures

INVENTOR
ROBERT L. DIXON
BY
Allan H. Lockabee
ATTORNEY

Patented May 30, 1972

INVENTOR
ROBERT L. DIXON

BY

*Alan Huckabee*

ATTORNEY

TUNNELING CUTTER GAGE RING REPLACEMENT

This invention relates to a method of providing a rotary cutter for tunneling machines and the like wherein the cutter body, generally frusto-conical, is provided with spaced circumferential rows of hardened metal inserts, preferably of tungsten carbide. The invention is also directed to a cutter resulting from the replacement method. The replaceable gage ring portion of the cutter with its hardened inserts and the remainder of the cutter body with its inserts can be initially constructed with a separate gage ring or, according to the method, a conventional cutter can be so operated upon that a removable gage ring portion is produced and a replacement gage ring portion provided.

Cutters of this type are disclosed in my copending application for patent, Ser. No. 33,819, filed May 1, 1970 and entitled "Rock Boring Cutter."

When boring tunnels with apparatus of this type, a vertically disposed rotary face plate provided with rotary cutters on its advance face, works against the rock formation. The face plate has an outer diameter about which is located certain of the rotary cutters which are termed gage cutters, since they determine the gage of the cut being made. The gage cutters, conventionally frusto-conical in shape, have their larger ends at the gage or peripheral of the tool, and their outer end faces and outer skirt portions with rows of hardened metal inserts thereabout are subject to much more destructive action than other portions of the gage cutters or other cutters located inwardly from the gage line. Not only do the gage ends of the gage cutters encounter uncut rock in front of and beside them, but they are also subjected to the abrasive action of broken pieces of formation working between the sides of the uncut formation and the outer or gage ends of the gage cutters. These portions of the gage cutters wear away relatively rapidly and soon the hardened metal inserts in the gage row of inserts are left without adequate support in the metal of the cutter body and they become displaced and the cutters will no longer operate efficiently.

In view of the fact that the rotary cutters discussed herein are conventionally formed in one piece to maintain them as strong as possible under the considerable pounding and abrasion to which they are subjected, because these cutters are studded rather profusely with hardened metal inserts and because no feasible manner of rehabilitation of the cutters has heretofore been conceived, they have been discarded when the gage ends of the cutters become worn and the gage row of metal inserts displaced, at least in part.

Attempts have been made to prolong cutter life by hard facing the gage ends of the cutter bodies with a layer of hard weld material but this does not sufficiently prolong cutter life to make it practical. It has also been impractical from an economic standpoint to try to build up the worn away gage end of the cutter body. The result is that in practice, until the time of the present invention, gage cutters which are worn as stated above, have been discarded as no longer fit for use. However, with the practice of my invention, it has been found quite feasible not only to reclaim worn gage cutters with displaced hardened inserts in the gage and adjacent rows, but it has also been found feasible to provide a gage cutter construction which initially is made with a separate gage ring portion which when worn to the point where the gage row of hardened inserts suffers partial or complete loss of inserts, the gage ring portion can be replaced. In either case, the effective life of the gage cutters of this type has been increased several fold because of the ability to provide new rows of gage inserts and replaceable gage ring body portions.

The above and other advantages become more apparent from the following description in connection with the accompanying drawings.

Figure 1:
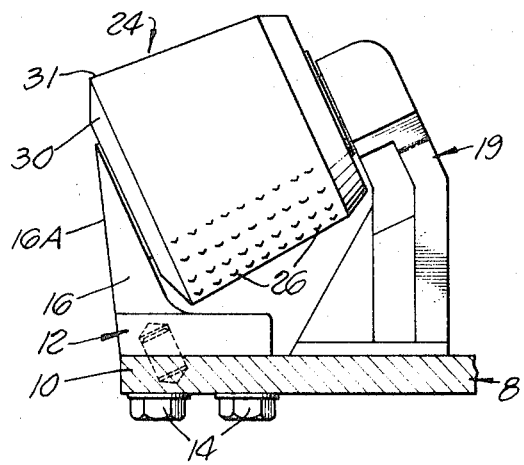
FIG. 1 is a side elevational view of a gage cutter and its mounting with a peripheral portion of a face plate in section.
Figure 2:
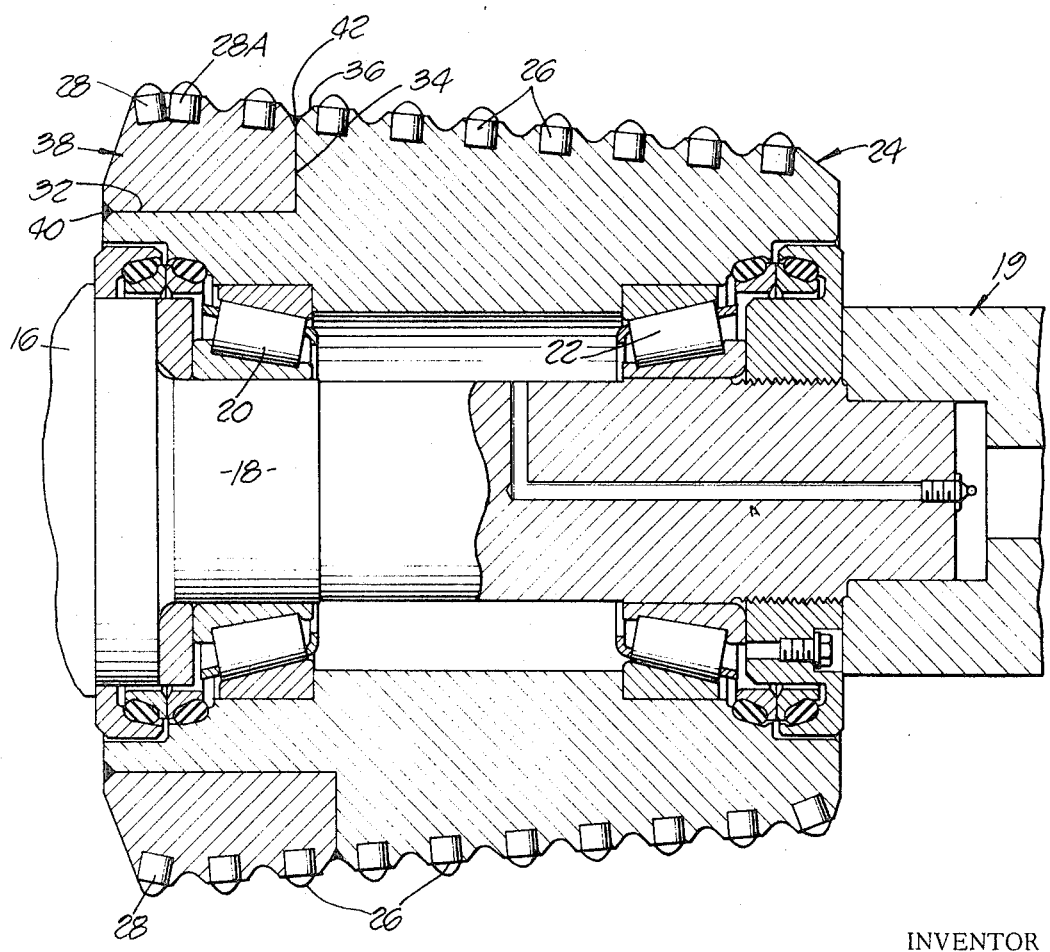
FIG. 2 is an enlarged vertical longitudinal sectional view through a cutter embodying a feature of the invention and showing the manner in which the cutter is rotatably mounted.

There is illustrated in FIG. 1 a portion of a rotary face plate 8, such as illustrated in the above identified copending application. This plate has an outer peripheral edge portion 10 which carries a bracket 12 secured by bolts 14. The bracket 12 has an upstanding "shirttail" portion 16 from which projects a bearing journal 18, shown in FIG. 2. The outer end of the journal 18 is supported by a bracket 19 which may be secured to the face plate 8 by welding. Mounted on the journal are bearing assemblies generally designated at 20 and 22, which support a frusto-conical rotary gage cutter 24 about the side wall of which are rows of hardened metal inserts 26, the row at the left or larger end of the cutter comprising a row of gage inserts 28. The next adjacent row 28A can also be considered a gage row although strictly speaking the outermost row is so considered.

It will be seen in FIG. 1 that the left or gage end of the cutter 24 is provided with a beveled portion 30 which is more or less aligned with the outer surface 16A of the shirttail. Cutter surface 31 which surrounds the hardened metal inserts, outer surface 30 and the shirttail are subjected to a great deal of abrasion from parts of the formation which have been cut away and which tend to accumulate about the gage portion of the face plate 8 due to the difficulty in removing the cutaway formation quickly enough to prevent such accumulation and abrasion. This accumulation is one of the functional difficulties encountered in machinery of this type. Actually however, much of the extreme wear is taken by the beveled surface 30 around the gage end of the cutter. The metal of the cutter body wears away fairly rapidly so that there is insufficient material to hold the inserted hardened elements 28, and sometimes the next row 28A, with the result that when the inserts loosen and become lost, the entire gage corner of the cutter 24 fails to perform its proper cutting action and the cutter heretofore has been discarded.

I have found that cutter life can be prolonged to some extent by the application of a hard surface weld to the surfaces 30 and 31 of the cutter but the time and expense involved, compared to the relatively short lengthening of cutter life, is not a satisfactory answer. Because of the presence of the hardened metal inserts in the side wall of the cutter, it has heretofore been considered impractical to remove the inserts and machine the cutter preparatory to replacing portions thereof, and because of the shocks and heavy loads to which the cutters are subjected, it has always been considered impractical to try to produce anything other than a heavy one-piece cutter body.

I then found that worn cutters with missing inserts in their gage rows can be rehabilitated by cutting inwardly along a surface of revolution 32 to a point inwardly past two or three circumferential rows of hardened inserts. I then cut downwardly along a plane 34 to intersect with the face 32, the cut 34 preferably being made inwardly from a valley 36 located between adjacent rows of hardened inserts. The valleys are provided on the cutters to facilitate chip clearance.

Then I provide a replacement gage ring portion 38 which is pressed on the surface of revolution 32 until it abuts tightly against the surface 34. Then the replacement gage ring portion can be secured by welds at 40 and 42. The replacement gage ring portion 30 of course is provided with the proper replacement rows of hardened inserts, and when the ring has been forced into position and welded, the cutter is in condition for a use life equal to its original use life until gage ring portion replacement is again required. The remainder of the cutter body will stand up considerably longer than the gage ring portion so that the effective life of the cutter is increased at least several times.

With the gage ring portion 38 pressed onto the surface of revolution 32 and welded in position, the cutter assembly is substantially as solid as if the cutter body were in one piece.

Figure 3:
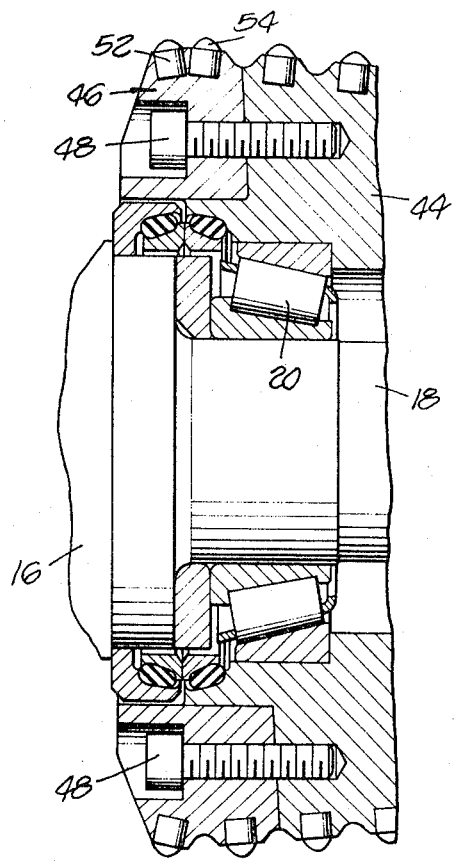
FIG. 3 is a fragmentary sectional view through the gage of end of a cutter showing a form of replaceable gage ring.
Figure 4:
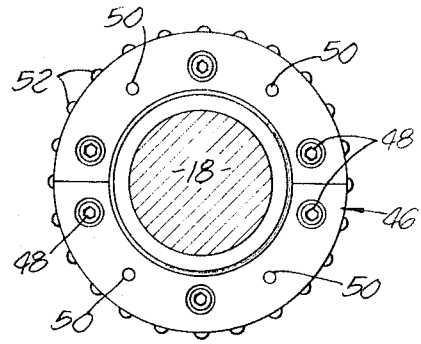
FIG. 4 is an end elevation of the gage end of a cutter.
Figure 5:
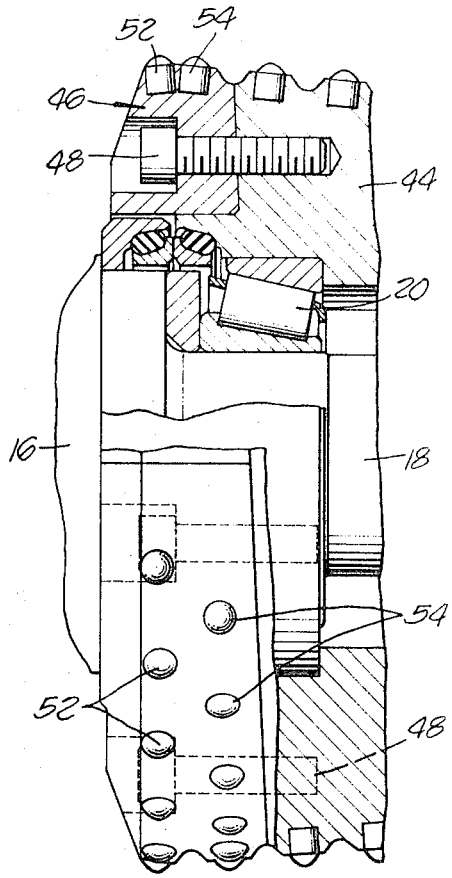
FIG. 5 is an enlarged fragmentary sectional view similar to FIG. 3 and showing some of the gage row of hardened inserts.

In FIGS. 3 and 5, there is shown an embodiment wherein a cutter body 44 is provided similar to the cutter body 24 of the first embodiment. However, in this form there is a gage ring body portion 46 which can be pressed into position and then secured by bolts 48 instead of by welds so that replacement is facilitated when the gage ring portion becomes worn. To relieve the bolts 48 from the shear forces tending to rotate the gage ring portion 46, I provide dowels 50 between the bolts 48 as indicated in FIG. 4. In FIGS. 3 through 5 the gage row of inserts 52 is shown, and in FIG. 5 a portion of the next adjacent row of inserts 54 is illustrated.

Figure 6:
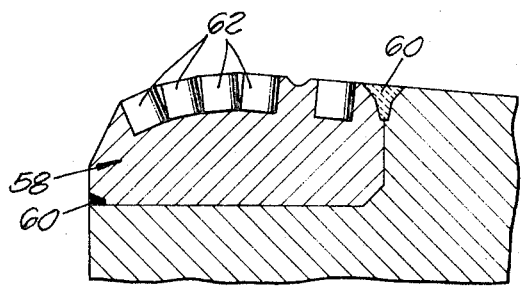
FIG. 6 is an enlarged fragmentary sectional view through a portion of the gage end of a gage cutter with another form of separate gage ring and its inserts.

In FIG. 6 there is shown a cutter body portion 56 and a replaceable gage ring portion 58 which may be secured by welds 60. As shown, the ring portion is formed at its outer corner on more of a radius than the ring portions 46 and 38. Also, ring portion 58 is provided with hardened insert sockets 62 which are closer together than in the other embodiments so that a more complete hardened insert armoring of the radiused surface of the gage ring 58 is provided.

From the foregoing it will be seen that I have provided a method and product wherein the life of gage cutters for tunneling machines can be greatly increased by providing a specific type of replaceable gage ring portion of the cutter body, which portion carries one or more rows of new and tightly embedded hardened metal inserts.

It will of course be understood that various changes can be made in the form, detail, arrangement and proportion of the parts, and the specific steps of the method, without departing from the spirit of the invention.

I claim:

1. A method of replacing the gage ring portion of a rotary tunneling cutter having a metal body with an axis of rotation and having hardened metal inserts embedded therein in rows thereabout, beginning with a gage row at the gage end of said body, said rotary body, at its gage end, having an end face, wherein the method includes: providing a first area of separation constituting a surface of revolution located radially outwardly from said axis of revolution and radially inwardly from the inner ends of said hardened metal inserts, said area of separation extending axially inwardly from said end face a distance beyond at least the gage row of inserts, said area of separation terminating at a plane transverse to said axis of rotation and located between two of said rows of inserts, providing a second area of separation about said body from the circumference of the body inwardly of said transverse plane and intersecting said first area of separation, the two areas of separation defining a removable gage ring portion, and replacing a worn gage ring portion having displaced hardened metal inserts with an unworn gage ring portion having a complement of hardened metal inserts.

2. The method in claim 1, and providing welds along the exposed adjacent surfaces of said rotary body and said replaced gage ring portion.

3. The method of claim 1, and the replacing of an unworn gage ring portion being accomplished by pressing the ring portion on the rotary body and then mechanically securing the ring to the body.

4. The method in claim 1, and the replacing of an unworn gage ring portion being accomplished by pressing the ring on the rotary body, and locking the ring against rotation about the body with dowels.

5. The method in claim 1, and the replacing of an unworn gage ring portion being accomplished by pressing the ring on the body, bolting the pressed ring to the body, and locking the ring against rotation about the body with dowels.

6. A rotary gage cutter for tunneling machines and the like for use about the edge or gage surface of a rotary face plate, wherein the improvement comprises: a rotary cutter body having an axis of rotation and having a side wall with a plurality of spaced rows of hardened metal inserts therein, said body having valleys circumferentially about its side wall between rows of inserts, the cutter body having a gage end adapted to lie at the gage edge portion of a rotary face plate, said gage end being of reduced diameter axially inwardly from said end and terminating at a plane transverse to said axis of rotation and coinciding with a valley portion between adjacent rows of inserts, said body enlarging approximately to its side wall diameter along said plane, to provide, with said reduced diameter, a circumferential rabbet about said body, a gage ring having about its circumference at least one row of hardened meta inserts, and means securing said gage ring on said reduced diameter of said body and in said circumferential rabbet.

* * * * *